No. 752,416. PATENTED FEB. 16, 1904.
R. B. PRICE.
RUBBER VEHICLE TIRE.
APPLICATION FILED JUNE 23, 1903.
NO MODEL.
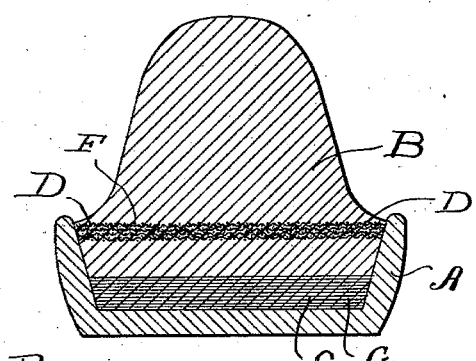
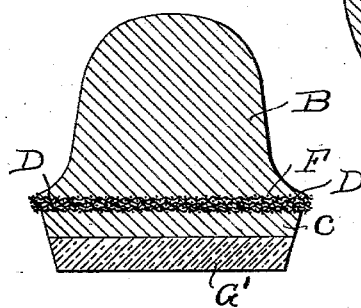
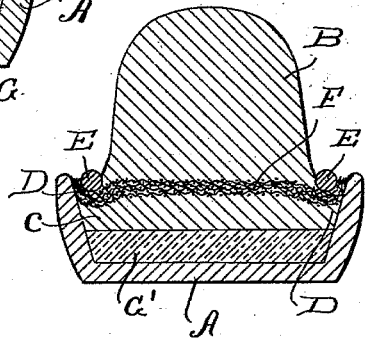
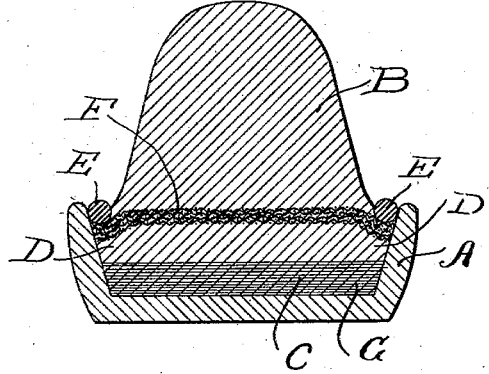
Witnesses:
E. F. Wilson
H. Walter Foster
Inventor:
Raymond B. Price
By Rudolph M. Foss
Attorney No. 752,416. Patented February 16, 1904.

UNITED STATES PATENT OFFICE.

RAYMOND B. PRICE, OF CHICAGO, ILLINOIS.

RUBBER VEHICLE-TIRE.

SPECIFICATION forming part of Letters Patent No. 752,416, dated February 16, 1904.

Application filed June 23, 1903. Serial No. 162,712. (No model.)

*To all whom it may concern:*

Be it known that I, RAYMOND B. PRICE, a citizen of the United States, residing at Chicago, in the county of Cook and State of Illinois, have invented certain new and useful Improvements in Rubber Vehicle-Tires; and I do hereby declare the following to be a full, clear, and exact description of the invention, such as will enable others skilled in the art to which it appertains to make and use the same.

My invention relates to a novel construction in a rubber vehicle-tire, the object being to provide a simple and efficient device of this character; and it consists in the features of construction and combinations of parts hereinafter fully described and claimed.

In the accompanying drawings, illustrating my invention, Figure 1 is a transverse section of my tire, showing same before the retaining-bands are sprung in place. Fig. 2 is a similar section showing my tire after the retaining-bands are sprung in place. Fig. 3 is a similar section showing a slight modification. Fig. 4 is a similar section showing another slight modification.

In said drawings, A indicates the rim or channel of a vehicle-wheel, and B the tire, the base portion of which is formed to fit said rim or channel A. The said base portion C is of greater width than the tread portion of said tire, thus forming flanges D at each side of the upper portion of said base to receive retaining wires or bands E, the latter being endless and sprung over the flanges of the rim or channel A and bearing upon said flanges D of said tire to hold the same securely in said rim. In order to prevent said retaining wires or bands E from cutting into the rubber or working their way between the flanges of the rim and the sides of the base portion of the tire, I provide in the upper portion of said base portion a plurality of layers F, of a frictioned fabric, which extend into or beyond the flanges D and terminate at or beyond the sides of the base of the tire, said fabric being so located as to be exposed or almost exposed on the upper faces of the flanges. This will cause the retaining wires or bands E to bear directly or almost directly upon said fabric and to be supported and held against displacement thereby. The said fabric F is preferably of a loosely-woven or open-mesh character, so that in vulcanization the rubber will flow through and obtain a good hold thereon, and, further, so that such fabric shall not be rendered so stiff as to prevent the same from yielding to the pressure of the retaining wires or bands. The latter are preferably composed of heavy-gage wire, so that the main pressure exerted thereby on the flanges of the tire will be inwardly from the edges of the latter and will consequently cause such wires or bands to partially embed themselves in said flanges and pinch the outer edges thereof against the flanges of the rim. The fabric will yield to such pressure and at its edges form channels in which the wires or bands will lie. Were the fabric of the closely-woven stiff nature generally employed, there would be a tendency for the tread portion of the tire to tear away from the said fabric; but by the employment of softer and more open fabric this difficulty is overcome by reason of the fact that the rubber obtains a firmer hold on the fabric, and, further, because the fabric yields to strains on the tread portion and follows the same. Below said layers E of fabric a thick layer of rubber is interposed, and below the same is a plurality of layers G of stiff frictioned fabric, which render said base laterally non-compressible. The said intervening layer of rubber serves as a cushion to enable the retaining-bands to be sprung into place and by reason of the yielding nature of the fabric E also yields to pressure on the tread portion, thereby extending the resiliency of the tire into the base and increasing its cushioning action.

The most essential feature of my invention resides in the interposition of the yielding fabric in the upper portion of the base, which, while taking the strain imparted by the retaining-bands, does not interfere with the resiliency of the tire and serves to so direct the pressure on the base as to cause the lower layer of rubber to be spread and compressed against the flanges of the rim, thus preventing moisture and dirt from entering between said tire and rim.

The stiff base is very advantageous, for the reason that it positively prevents local travel of the tire—that is, it prevents the tire from being moved around the rim little by little, as is the case with the average tire, as by reason of its great stiffness any longitudinal movement of the tire at one point would involve movement over the entire length, and this is rendered practically impossible by the great pressure exerted on the tire by the retaining-bands.

I do not desire to be understood as limiting the stiffening of the base to the intermolding of frictioned fabric, as the same result may be accomplished by forming said base of a harder rubber, as shown at G' in Figs. 3 and 4, or in any other suitable manner.

It frequently happens that the rims or channels of vehicle-tires vary slightly from standard sizes and that consequently the tires sometimes fit loosely therein. I prefer, therefore, to extend the upper layers of frictioned fabric beyond the flanges of the tire, so that if the tire fits loosely or even only snugly in the rim such projecting edges will lie in contact with the flanges of the said rim or channel and extend upwardly along the same. The bands in springing over the said flanges will then compress such projecting edges very tightly against the rim or channel and will serve to prevent the admission of moisture or mud between the flanges of the rim and the base of the tire and will also positively prevent the bands from working their way between the flanges of the rim and the base of the tire. Where the tire fits sufficiently tight in said rim or channel, the said projecting edges of said fabric may be trimmed off, as shown in Fig. 2.

I claim as my invention—

1. A vehicle-tire comprising a rubber tread portion adapted to project above the side flanges of the wheel-rim, lateral offsets or shoulders arranged to extend opposite the upper portions of said rim-flanges and constituting at such point the widest part of the tire, soft, yielding fabric extending into said offsets or shoulders, and a cushion of rubber at the base of said tire and beneath said fabric.

2. The combination with the rim or channel of a vehicle-wheel, of a tire having its base formed to fit the same, flanges above the base of said tire, fabric intermolded in the upper portion of the base of said tire and extending into the said flanges, a cushioning layer of rubber below said fabric, said fabric being of a soft, yielding nature and adapted to yield to the strains on the tread portion, and retaining means adapted to bear upon the flanges of said tire, said fabric being so located relatively to said flanges as to receive the strains exerted by said retaining means and prevent the latter from cutting the rubber.

3. The combination with the rim or channel of a vehicle-wheel, of a tire having its base formed to fit the same, flanges above the base of said tire, fabric intermolded in said base of said tire and extending into the said flanges, said fabric being of a soft, yielding, open-mesh nature adapted to permit the permeation of rubber therethrough and adapted to yield to pressure on the tread portion, and retaining means adapted to bear upon the flanges of said tire, said fabric being so located relatively to said flanges as to receive the strains exerted by said retaining means and prevent the latter from cutting into said flanges.

4. The combination with a vehicle-wheel and a rim or channel thereon, of a tire provided at its base portion with flanges and having such base portion conforming in shape with said rim or channel, a layer of frictioned fabric intermolded in the upper portion of the base portion of said tire and extending into the flanges thereof, a plurality of plies of frictioned fabric intermolded in the bottom of the base of said tire, a layer of rubber between said layer and said plies, and retaining-bands adapted to be sprung over the flanges of said rim or channel and bear upon said flanges of said tire, said layer of fabric being so located as to receive the strain exerted by said retaining-bands, substantially as and for the purpose set forth.

5. The combination with a vehicle-wheel and a rim or channel thereon, of a tire provided at its base portion with flanges and having such base portion conforming in shape with said rim or channel, a layer of frictioned fabric intermolded in the upper portion of the base portion of said tire and extending beyond the flanges thereof, a stiff bottom on said base, a layer of soft, resilient rubber interposed between said stiff base and said layer of frictioned fabric, and retaining-bands adapted to be sprung over the flanges of said rim or channel and bear upon said flanges of said tire and pinch the projecting edges of said fabric against the flanges of said rim or channel, said frictioned fabric being so located in said tire as to be directly subjected to the pressure of said bands to relieve the rubber of strain, substantially as and for the purpose set forth.

6. The combination with the rim or channel of a vehicle-wheel, of a tire having its base portion formed to fit the same, flanges above the base of said tire, a plurality of plies of frictioned fabric intermolded in the upper portion of the base of said tire and extending into the said flanges, a cushioning layer of rubber below said plies of fabric, said fabric being of a yielding nature and adapted to yield to strains on the tread portion, and retaining-bands adapted to be sprung over the flanges of said rim or channel and bear upon the flanges of said tire, said fabric being so located relatively to said flanges as to receive the strain exerted by said retaining-bands and prevent the latter from cutting the rubber.

7. The combination with the rim or channel of a vehicle-wheel, of a tire having its base portion formed to fit the same, flanges above the base of said tire, a plurality of plies of frictioned fabric intermolded in the upper portion of the base of said tire and extending beyond the flanges thereof, a cushioning layer of rubber below said plies of fabric, said fabric being of a soft yielding nature and adapted to yield to pressure on the tread portion, and retaining-bands adapted to be sprung over the flanges of said rim or channel and bear upon the flanges of said tire and pinch the projecting edges of said fabric against the flanges of said rim or channel, said fabric being so located relatively to said flanges of said tire as to directly receive the strains exerted by said bands and relieve the rubber, substantially as and for the purpose described.

8. The combination with the rim or channel of a vehicle-wheel, of a tire having its base portion formed to fit the same, flanges above the base of said tire, a plurality of plies of frictioned fabric intermolded in the upper portion of the base of said tire and extending into the said flanges, a cushioning layer of rubber below said plies of fabric, said fabric being of a yielding nature and adapted to yield to strains on the tread portion, and retaining-bands of heavy-gage wire adapted to be sprung over the flanges of said rim and bear upon the flanges of said tire inwardly from the edges thereof, said fabric being so located relatively to said flanges as to receive the strain exerted by said retaining-bands and preventing the latter from cutting the rubber.

9. The combination with the rim or channel of a vehicle-wheel, of a rubber tire adapted to fit said rim or channel, flanges on said tire, a plurality of plies of frictioned fabric intermolded in said tire and extending into said flanges, a cushioning layer of rubber below said plies of fabric and retaining-bands of heavy-gage wire adapted to be sprung over the flanges of said rim or channel and bear upon said flanges of said tire inwardly from the edges thereof, said fabric being of a soft, open character to render same yielding, and so located relatively to the flanges as to receive the strain exerted by said bands, said bands being adapted to partially embed themselves in said flanges and pinch the edges of the same against the flanges of the rim or channel.

10. The combination with the rim or channel of a vehicle-wheel, of a rubber tire adapted to fit said rim or channel, a plurality of plies of stiff frictioned fabric in the base of said tire, a layer of rubber above said base, flanges on said tire, a plurality of plies of an open-mesh frictioned fabric intermolded in said tire above said layer of rubber and extending into the flanges thereof, and retaining-bands of heavy-gage wire adapted to be sprung over the flanges of said rim or channel and bear upon the flanges of said tire, said uppermost plies of fabric being so located relatively to said flanges as to receive the strain exerted by said retaining-bands and being adapted to yield to such strains, whereby the edges of said fabric become pinched between said bands and the flanges of the rim.

11. The combination with the rim or channel of a vehicle-wheel of a rubber tire having a base of greater width than the tread portion and formed to fit said rim or channel, a layer of frictioned fabric intermolded in said base portion of said tire and extending over the greatest width of same, a cushioning layer of rubber below said fabric, a stiff bottom on said cushioning layer of rubber and retaining-bands adapted to be sprung over the flanges of said rim or channel and bear upon the widest portion of said tire, said layer of fabric being relatively so located as to receive the strain exerted by said retaining-bands and prevent the latter from cutting the rubber.

12. The combination with the rim or channel of a vehicle-wheel of a rubber tire having a base of greater width than the tread portion and formed to fit said rim or channel, a layer of soft, open-work frictioned fabric intermolded in said base portion of said tire and extending over the greatest width of same, a cushioning layer of rubber below said fabric, stiffening means below the said cushioning layer of rubber, and retaining-bands adapted to be sprung over the flanges of said rim or channel and bear upon the widest portion of said tire, said layer of fabric being relatively so located as to receive the strain exerted by said retaining-bands and prevent the latter from cutting the rubber.

In testimony whereof I affix my signature in presence of two witnesses.

RAYMOND B. PRICE.

Witnesses:
  RUDOLPH WM. LOTZ,
  E. F. WILSON.